United States Patent [19]

Chiola et al.

[11] 4,032,791

[45] June 28, 1977

[54] FLUORESCENT SCREEN AND METHOD OF MAKING

[75] Inventors: Vincent Chiola; Sixdeniel Faria, both of Towanda, Pa.

[73] Assignee: GTE Sylvania Incorporated, Stamford, Conn.

[22] Filed: June 16, 1976

[21] Appl. No.: 696,799

[52] U.S. Cl. ................................ 250/483; 427/157; 427/250

[51] Int. Cl.² ........................................... G01T 1/00

[58] Field of Search ........... 250/483, 486; 427/157, 427/250

[56] References Cited

UNITED STATES PATENTS

| | | | |
|---|---|---|---|
| 3,107,198 | 10/1963 | Amborski et al. | 427/250 X |
| 3,213,341 | 10/1965 | Scotti et al. | 250/483 X |
| 3,783,297 | 1/1974 | Houston | 250/483 |
| 3,969,545 | 7/1976 | Slocum | 427/250 |

*Primary Examiner*—Archie R. Borchelt
*Attorney, Agent, or Firm*—Norman J. O'Malley; Lawrence R. Fraley; Donald R. Castle

[57] ABSTRACT

A fluorescent screen is disclosed which comprises a plastic film support layer, a reflectance layer of vacuum-deposited aluminum on said support layer, and a layer of fluorescent material dispersed in an organic polymeric binder located on said reflectance layer. A method for making the above screen is also disclosed.

8 Claims, 3 Drawing Figures

FLUORESCENT SCREEN AND METHOD OF MAKING

BACKGROUND OF THE INVENTION

The invention relates to fluorescent screens and more particularly to fluorescent screens for use as X-ray intensifying screens.

X-ray intensifying screens are usually mounted in pairs on opposing sides of an X-ray film for purposes of enhancing the exposure of said film. This enhancement is achieved due to the relatively high efficiency of the screens in converting X-ray energy into electromagnetic radiation within the ultraviolet (UV) and visible spectrums. Screens of this variety usually consist of a support layer, a reflectance layer, and a fluorescent layer. When employed in the paired relationship described, the fluorescent layers are normally positioned in contact with the opposing sides of the X-ray film to form a "casette". A protective layer is typically provided over the fluorescent layer to facilitate removal of stains, dust, dirt, and other undesirable matter from the screen's surface.

In typical intensifying screens of the known prior art, both the reflectance material, e.g. pigments of magnesium oxide or titanium dioxide, and the phosphors employed as the fluorescent material were dispersed in organic polymeric binders and deposited during separate operations on the supportive layer. Because of this practice of using organic binder, recovery and recycling of the phosphor materials from defective and other unused screen pieces has been exceedingly difficult. Normally, such a recovery process involves soaking the scrap pieces in a solvent such as acetone to dissolve the organic binder. Agitation is then utilized to assist in "peeling-off" the phosphors. subsequent steps typically include filtering and drying of the phosphors. Heretofore, analyses of phosphors recovered using the above method indicated the presence of either the magnesium oxide or titanium dioxide within the range of from about 0.5 to 5 percent. When recovered phosphors having said relatively high ranges for these non-luminescent diluents were subsequently utilized in the formation of new screens, an undesirable compromise in screen quality resulted. This condition also existed when the recovered phosphors were blended with virgin phosphor materials. On some occasions, it was necessary to scrap the recovered phosphors. This situation in turn presented an economical problem to the screen industry, particularly with the recent introduction of newer, more expensive X-ray phosphors such as those of the rare earth variety.

It is believed therefore that a fluorescent screen which eliminates the necessity for employment of an organic polymeric binder as an integral part of the reflectance layer typically used in such screens would constitute an advancement in the art.

It is further believed that a new method for making a screen of the variety described would constitute an art advancement. As will be understood by the following detailed description, the screen of the present invention possesses the desired features of relatively low lag (persistence) and increased speed (brightness) over fluorescent screens of the prior art.

OBJECTS AND SUMMARY OF THE INVENTION

It is a primary object of the present invention to enhance the fluorescent screen art.

It is another object of this invention to provide a fluorescent screen which will facilitate the recovery of phosphors typically employed in such screens.

It is still another object of the invention to provide a fluorescent screen which possesses relatively lower lag (persistence) and increased speed (brightness) values over screens of the prior art.

In accordance with one embodiment of the present invention, there is provided a fluorescent screen comprising a plastic film support layer, a reflectance layer of vapor-deposited aluminum on said support layer and a flexible layer of a fluorescent material dispersed in an organic polymeric binder, said flexible layer located on the described reflectance layer.

In accordance with another embodiment of the invention there is provided a method for making a fluorescent screen. The method comprises the steps of providing a plastic film support layer, vapor-depositing a reflectance layer of aluminum on the support layer, and providing a flexible layer of a fluorescent material dispersed in an organic polymeric binder on said reflectance layer.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
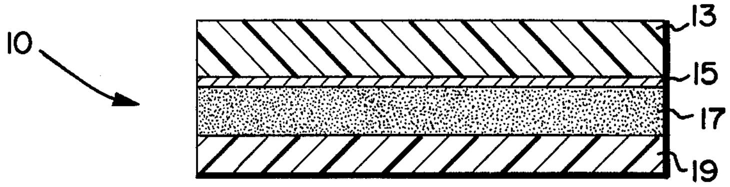
FIG. 1 is a side elevational view, in section, of a fluorescent screen in accordance with a preferred embodiment of the invention.

In FIG. 1 there is shown a fluorescent screen 10 in accordance with a preferred embodiment of the invention. Screen 10, preferably of the X-ray intensifying variety, comprises a plastic film support layer 13, a relatively thin reflectance layer 15 of vapordeposited aluminum, and a flexible layer 17 of a fluorescent material dispersed in an organic polymeric binder.

A preferred plastic film material for support layer 13 is sold under the trademark Mylar, held by the E. I. DuPont de Nemours & Company, Wilmington, Delaware. Mylar, a known polyester, possesses the flexibility and strength required for support layer 13 in addition to being readily available on the marketplace. It is understood, however, that practically any of the other plastic films well known in the art could successfully be used for support layer 13.

Vapor-deposited on support layer 13 is a reflectance layer 15 of aluminum. As the X-ray beams pass through support layer 13 and provide excitation of fluorescent layer 17, many of the beams emitted by the material of layer 17 scatter randomly therein. Accordingly, the function of the thin aluminum reflectance layer 15 is to reflect many of these scattered beams onto the X-ray film. By doing so, layer 15 thus enhances the exposure of said film. The reflecting aluminum layer may be vapor-deposited on film support 13 using any of several vapor-deposition techniques well known in the art. Further description of these techniques is therefore not believed necessary. Vapor-deposition of aluminum on Mylar was successfully accomplished at temperatures approximating 500°. Such relatively low temperatures do not adversely affect, e.g. melt, deform, etc., the Mylar substrate.

The preferred material for flexible layer 17 is at least one type of phosphor. In the event that screen 10 is to be used as an X-ray intensifier, known X-ray phosphors are employed. Perhaps the most widely known X-ray phosphor which can be used in screen 10 is calcium tungstate. Others also acceptable for use include lead-activated barium sulfate, europium-activated barium sulfate, and silver-activated zinc cadmium sulfide. Rare earth-containing phosphors have been recently introduced which can also be used in layer 17. Among these are the terbium-activated gadolinium, lanthanum or yttrium oxysulfides, terbium-activated lanthanum oxyhalides, europium-activated barium fluorochloride, etc. The above fluorescent materials are dispersed within an organic polymeric binder, e.g. cellulose acetate, polyvinyl butyral, nitrocellulose, etc. and applied to aluminum layer 15. The preferred method for accomplishing this is to slurry the phosphor in the binder and thereafter draw the slurry by means of a doctor blade or similar device onto the reflectance material.

The thickness for support layer 13 is preferably within the range of about 0.177 mm (millimeters) to about 0.3048 mm. Accordingly, the preferred thickness for the vapor-deposited thin aluminum layer is within the range of about 0.0127 mm to about 0.0254 mm. It can therefore be seen that support layer 13 is preferably within the range of about 7 to about 24 times as thick as aluminum layer 15. That is, the ratio of thicknesses of these layers is within the range of 7:1 to about 24:1.

When using the above dimensional ranges, it is preferred that the thickness of flexible layer 17 be within the range of from about 0.0916 mm to about 0.2794 mm. The ratio of thicknesses layer 17 to reflectance layer 15 is therefore within the range of from about 4:1 to about 22:1.

As shown in FIG. 1, screen 10 may also include a protective layer 19 of a transparent plastic coating, e.g. nitrocellulose, ethylcellulose, etc. Layer 19 is illustrated as positioned on fluorescent layer 17 and is preferably about .5 mm thick.

Figure 2:
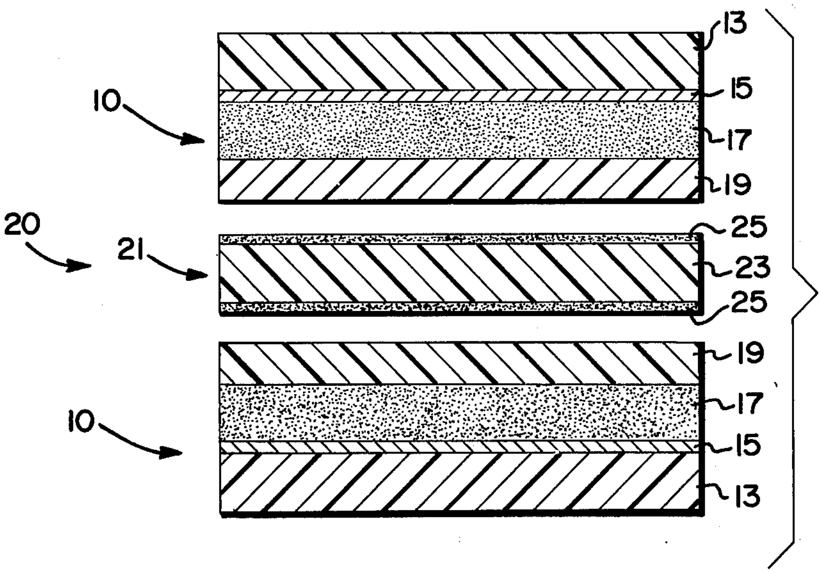
FIG. 2 is a side elevational view of an X-ray intensifying system utilizing two of the screens of FIG. 1.

FIG. 2 represents an X-ray intensifying system 20 which incorporates two of the screens 10 of FIG. 1. System 10 further comprises an X-ray film 21 which includes a base member 23 and opposing layers 25 of a suitable emulsion. The preferred materials for member 23 and layers 25 are well known in the art and further description is therefore not considered necessary.

As illustrated, each of the screens 10 are arranged in system 20 in order that the fluorescent layers 17 of each screen are positioned in a facing relationship with the corresponding emulsion layers 25 on film 21. As described above, each of the screens 10 may further include the protective layers 19 thereon which engage layers 25 when system 20 is fully assembled. Should protective layers 19 not be employed, the fluorescent layers 17 would engage the respective emulsion layers 25.

Figure 3:
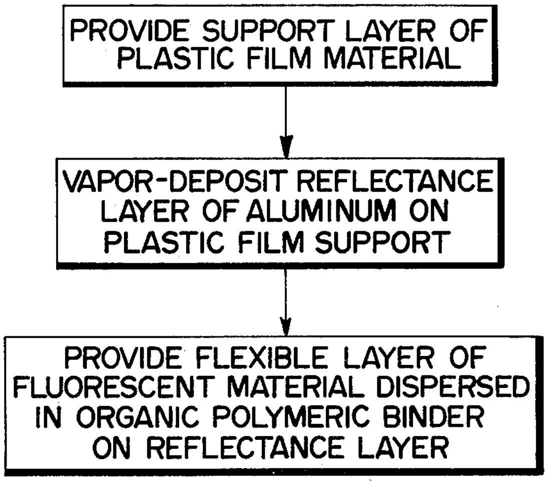
FIG. 3 is a flow diagram illustrating the preferred steps of the method of the invention.

FIG. 3 of the drawings represents the aforementioned preferred steps for producing one of the screens 10 of the invention. The method includes: (a) providing a supportive layer of a plastic film; (b) vapor-depositing a relatively thin reflectance layer of aluminum on the supportive layer; and (c) providing a flexible layer of fluorescent material dispersed in an organic polymeric binder on the thin reflectance layer. As previously stated, the method of the invention can be expanded to include providing a protective layer of a transparent plastic coating on the fluorescent layer. The screens of the present invention, having the aforementioned preferred materials and thickness ranges, possess lower values of lag (persistence) and higher values of speed (brightness) compared to known screens of the prior art. This was determined by conducting optical density tests on several X-ray films exposed using said screens.

It is to be understood that tests for screen lag differs from those for measuring screen speed. Lag (persistence of the X-ray excited fluorescent material of the screen) is measured by exposing the described "casette", minus the X-ray film, to approximately 85 kilovolts, 5 milliamps, for 12 seconds at about 20 inches from the focal spot of the X-ray generating tube employed in the X-ray exposure equipment. At approximately 1 minute from the completion of this exposure, the X-ray film is positioned in the casette and remains therein for about 10 minutes. Thereafter, the film is developed using normal X-ray film processing methods.

The optical density values of this film are then measured using a Macbeth densitometer, model TD-504, a well known testing instrument. Typical optical density readings for films exposed in the above manner using screens having titanium dioxide-organic polymeric binder reflectance layers ranged from about 0.22 to about 0.28 on the instrument's meter. Readings for films exposed as above using screens having vapor-deposited aluminum reflectance layers ranged from about 0.12 to about 0.18. The above optical density readings of the developed X-ray films in turn indicate the relative values for the lag (persistence) of the screen utilized during these tests. Lower optical density readings for the films, as obtained in the described lag tests, are indicative of low lag values for the respective screens. Low lag is of course highly desirable for X-ray intensifying screens.

The testing for screen brightness (speed of the X-ray excited fluorescent material) was conducted differently than the described lag testing. The respective casettes, including the screens to be evaluated and X-ray film, were exposed at approximately 64–66 kilovolts, 100 milliamps, for 0.5 seconds at about 40 inches from the focal point of the X-ray generating tube. The exposed film was immediately removed from the casette and developed using normal X-ray film processing techniques. Optical density readings of these films were then taken using the aforementioned Macbeth densitometer. Films exposed in the above manner, utilizing screens having vapor-deposited aluminum reflectance layers, exhibited higher optical density readings than film exposed using titanium dioxide-polymeric binder reflectance layered screens. Overall, vapor-deposited aluminum screens possessed brightness values about 7 to 10 percent greater than the titanium-dioxide screens.

It is of course understood that higher optical density values for X-ray film processed in the above manner (brightness testing) are indicative of higher speed or brightness of the X-ray excited fluorescent materials in said screens. Greater brightness i.e. speed, is a highly desirable characteristic for X-ray intensifying screens.

Although the reasons for lower optical density readings obtained during the described lag testing are not fully understood at this time, it is suggested that the above reductions result in part from a filtering out of undesirable long wavelength X-rays by the thin vapor-deposited aluminum layers. Said X-rays are thus prohibited from reaching the corresponding fluorescent layers.

It is further submitted that the higher optical density readings obtained during the described brightness testing resulted in part from the increased reflectance capability of the aluminum layers. It is believed that said layers do not absorb the UV portion of the spectrum emitted by the respective X-ray phosphors. Titanium dioxide, on the other hand, does absorb part of the UV portion of the spectrum, perhaps as much as 10 percent. The above is believed particularly true when utilizing X-ray phosphors in which a portion of the light emitted therefrom falls below the 400 nm (nanometer) range of the spectrum. At least one of the newer rare earth-containing phosphors (europium-activated barium fluorochloride) has an emission peak at about 380–390 nm. Accordingly, a reflector layer which does not absorb UV emission offers a distinct advantage in screens which incorporate phosphors which have all or a portion of their emission below 400 nm.

Spectrographic analyses of phosphors recovered from fluorescent screens having pigments of titanium dioxide or magnesium oxide dispersed in an organic polymeric binder as the reflectance layer indicated the presence of relatively large amounts, e.g., 0.5 to 5 percent, of this pigment material therein. These levels are considered unacceptable for direct recycling of the phosphor and must therefore be substantially reduced before the recovered phosphors can be reused. Because the processes required to obtain these reductions have proven expensive and time-consuming, it has often been necessary to scrap the recovered materials.

Atomic absorption analyses of phosphors having vapor-deposited aluminum reflectance layers indicate the presence of only negligible amounts, e.g. less than one part per million, of aluminum therein. These levels are considered acceptable to permit phosphor reuse without compromising brightness or speed quality of the final product. It can therefore be seen that fluorescent screens of the present invention greatly facilitate the recovery of the phosphors employed therein.

Thus there has been shown and described a new fluorescent screen which exhibits greater brightness and lower persistence values than screens of the known prior art. The screen of the invention also facilitates recovery of the phosphors typically utilized as the fluorescent material therein. There has also been shown and described a method for making said screens.

While there has been shown and described what are at present considered the preferred embodiments of the invention, it will be obvious to those skilled in the art that various changes and modifications may be made therein without departing from the scope of the invention as defined by the appended claims.

What is claimed is:

1. A fluorescent screen comprising:
- a plastic film support layer having a first thickness;
- a reflectance layer of vapor-deposited aluminum on said support layer and having a second thickness, the ratio of thicknesses of said support layer to said reflectance layer within the range of from about 7:1 to about 24:1;
- a flexible layer of a fluorescent material dispersed in an organic polymeric binder, said flexible layer located on said reflectance layer and having a third thickness, the ratio of thicknesses of of said flexible layer to said reflectance layer within the range of from about 4:1 to about 22:1.

2. The fluorescent screen according to claim 1 wherein said plastic film support layer is Mylar.

3. The fluorescent screen according to claim 2 wherein said fluorescent material is an X-ray phosphor.

4. The fluorescent screen according to claim 3 wherein said X-ray phosphor is a rare earth-containing phosphor.

5. A method for making a fluorescent screen, said method comprising:
- providing a support layer of plastic film material having a first thickness;
- vapor-depositing a reflectance layer of aluminum having a second thickness on said support layer, the ratio of thicknesses of said plastic film to said reflectance layer within the range of from about 7:1 to about 24:1, and
- providing a flexible layer of fluorescent material dispersed in an organic polymeric binder on said reflectance layer, said flexible layer having a third thickness, the ratio of thicknesses of said flexible layer to said reflectance layer within the range of from about 4:1 to about 22:1.

6. The method according to claim 5 wherein said plastic film material is Mylar.

7. The method according to claim 6 wherein said fluorescent material is an X-ray phosphor.

8. The method according to claim 7 wherein said X-ray phosphor is a rare earth-containing phosphor.

* * * * *

UNITED STATES PATENT AND TRADEMARK OFFICE

CERTIFICATE OF CORRECTION

PATENT NO. : 4,032,791

DATED : June 28, 1977

INVENTOR(S) : Vincent Chiola and Sixdeniel Faria

It is certified that error appears in the above-identified patent and that said Letters Patent are hereby corrected as shown below:

Col. 1, line 30 - After "using", please insert -- an --.

Col. 3, line 2 - Please delete "$500^{o}$" and insert -- $500^{o}$ Celsius --.

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*